Aug. 19, 1947.  G. C. NYDEGGER  2,426,115
CARTON ERECTING APPARATUS
Filed May 17, 1945  6 Sheets-Sheet 1

INVENTOR.
George C. Nydegger
BY James T. Cullinan
Attorney

Aug. 19, 1947.  G. C. NYDEGGER  2,426,115
CARTON ERECTING APPARATUS
Filed May 17, 1945  6 Sheets-Sheet 3

INVENTOR.
George C. Nydegger
BY
James T. Cullinan
Attorney.

Aug. 19, 1947.  G. C. NYDEGGER  2,426,115
CARTON ERECTING APPARATUS
Filed May 17, 1945  6 Sheets-Sheet 4
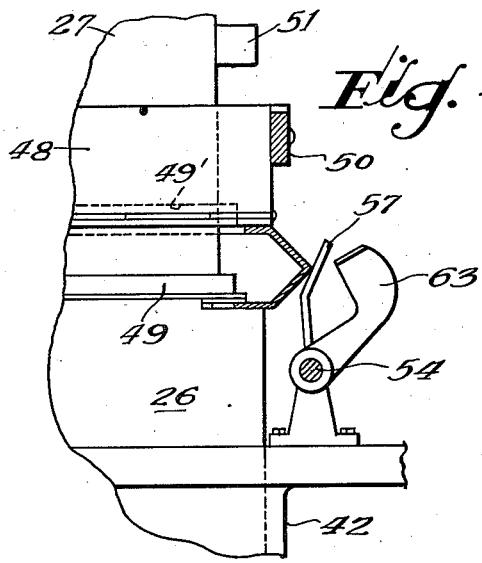
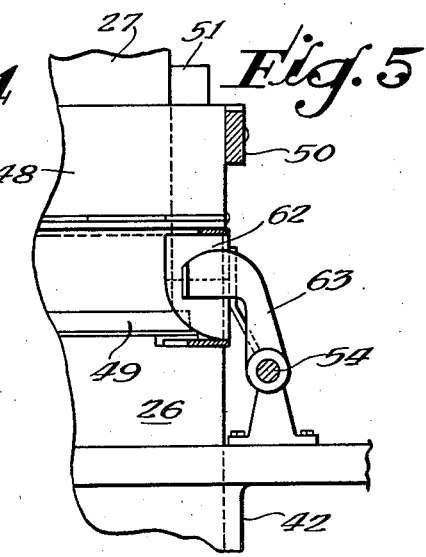
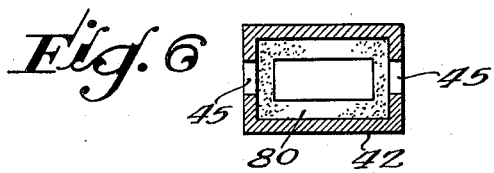
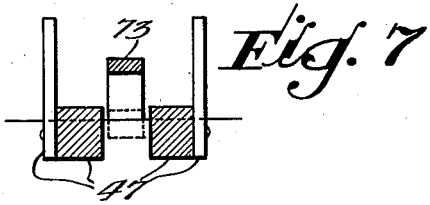
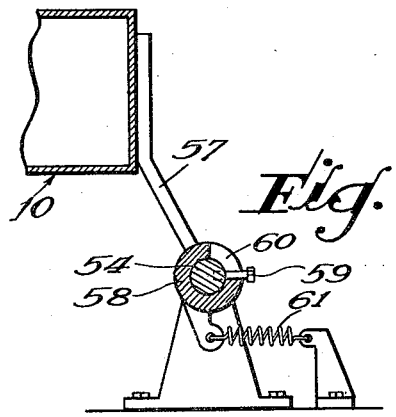
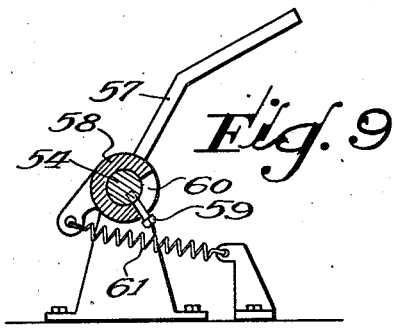
INVENTOR.
George C. Nydegger
BY James T. Cullinan
Attorney INVENTOR.
George C. Nydegger
BY James T. Cullinan
Attorney

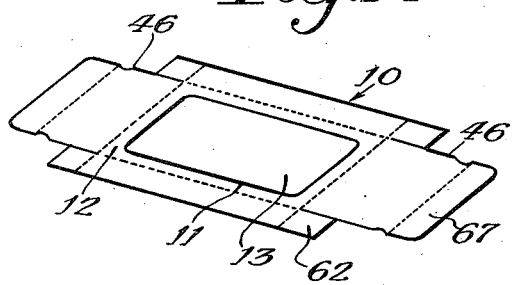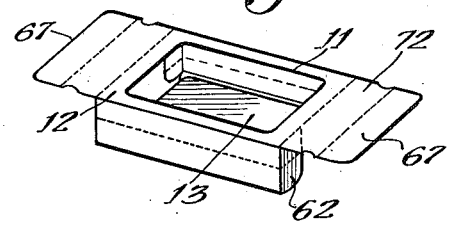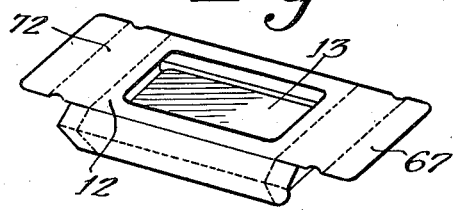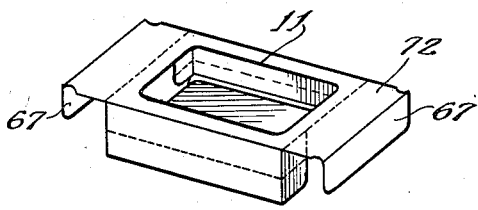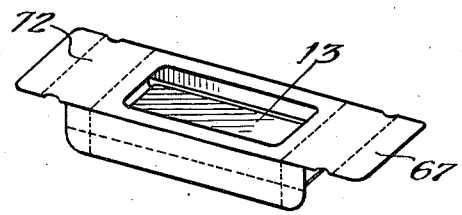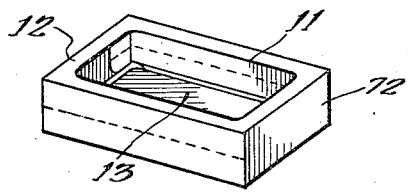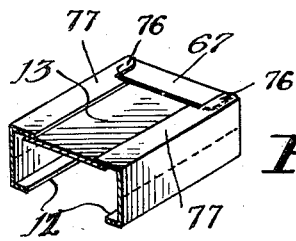

Patented Aug. 19, 1947

2,426,115

UNITED STATES PATENT OFFICE 2,426,115

CARTON ERECTING APPARATUS

George C. Nydegger, Los Angeles, Calif.

Application May 17, 1945, Serial No. 594,312

8 Claims. (Cl. 93—49)

This invention relates to apparatus for erecting paperboard cartons from a flattened state.

An object of my invention is to provide apparatus for automatically setting up the carton covered by my Patent No. 2,306,078, patented December 22, 1942.

Further objects of the invention will appear from the following specification taken in connection with the drawings which form a part of this application, and in which Fig. 1 is a front elevational view showing the apparatus embodying the features of my invention.

Fig. 4 is a fragmentary sectional view showing the apparatus for forming the sides of my carton.

Fig. 5 is a progressive fragmentary sectional view, similar to Fig. 4, showing the apparatus for tucking in the end flaps of my carton.

Fig. 6 is a plan view taken along the lines 6—6 of Fig. 1.

Fig. 7 is a sectional view taken along the line 7—7 of Fig. 1.

Fig. 8 is a detail sectional view showing the apparatus for squaring the sides of the carton.

Fig. 9 is a view similar to Fig. 8 showing the apparatus in inoperative position.

Fig. 14 is a perspective view of my carton in flattened state as it is fed to the erecting apparatus.

Figs. 15, 16, 17 and 18 are perspective views showing the progressive manner in which the carton is erected by the apparatus of my invention.

Fig. 19 is a perspective view of the carton in its completed set up state.

Fig. 20 is a fragmentary perspective view of the bottom of my carton showing the manner in which the end wall flaps are frictionally engaged with the bottom to hold the carton in erected position.

Figure 1:
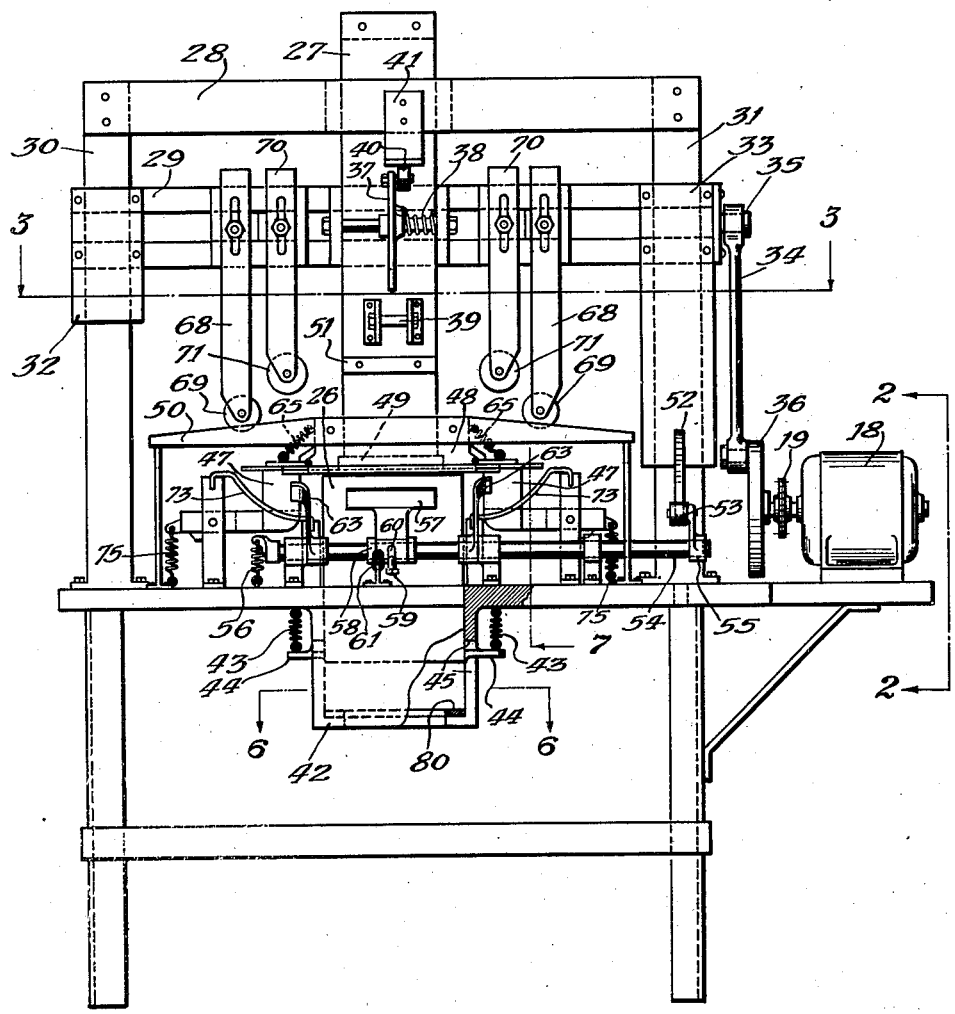

The apparatus of my invention is particularly adapted to set up the carton covered by my Patent No. 2,306,078, and the following description of the apparatus will have reference thereto. Briefly described, the invention consists of automatic means for feeding a flattened carton blank under a plunger; means for forcing the bottom of the carton down a predetermined distance, and continuous sequential means for folding the end flaps into frictional locking association with the body of the carton.

Further details of the invention will appear from the following description.

By reference to the drawings, and particularly Figs. 14 to 19, inclusive, the progressive stages of erection of my carton are shown. My carton blank 10 is composed of five sides with an open window 11 in the top thereof. A narrow marginal area 12 defines the window 11 and acts as a reinforcing means for the top of the carton. The struck-out window portion 11 of the carton is glued to tabs extending inwardly from the sides of the carton to form a bottom 13.

The flattened cartons 10 are vertically stacked in a stationary receptacle 14 (Figs. 2 and 3) positioned in the rear of the apparatus. One end of a transversely disposed shaft 15 is journaled in a bracket bearing 16 and may have a sprocket wheel 17 attached to the end thereof, the wheel 17 being connected to a source of power 18 by means of a sprocket chain 19. A crank arm 20 is fastened to the other end of shaft 15 and may be engaged with a vertically extending slotted arm 21 by means of the protruding roller 22. An elongated horizontally disposed sleeve member 23 is fixedly engaged to the top of arm 21 and may be slidably engaged with a rod 24 which extends therethrough.

When the crank arm 20 is rotated it will move the member 23 to the outer extremity of the rod 24, by means of the slotted arm 21, which will permit the stack of cartons 10 to fall to the bottom of receptacle 14 by means of gravity. As the member 23 is slid inwardly upon further rotation of the crank 20, a pointed prong 25 extending outwardly from the inner edge of member 23 will select the bottom carton blank in the receptacle 14 and push it in a horizontal direction onto a table 26 disposed in the same plane as member 23.

Figure 2:
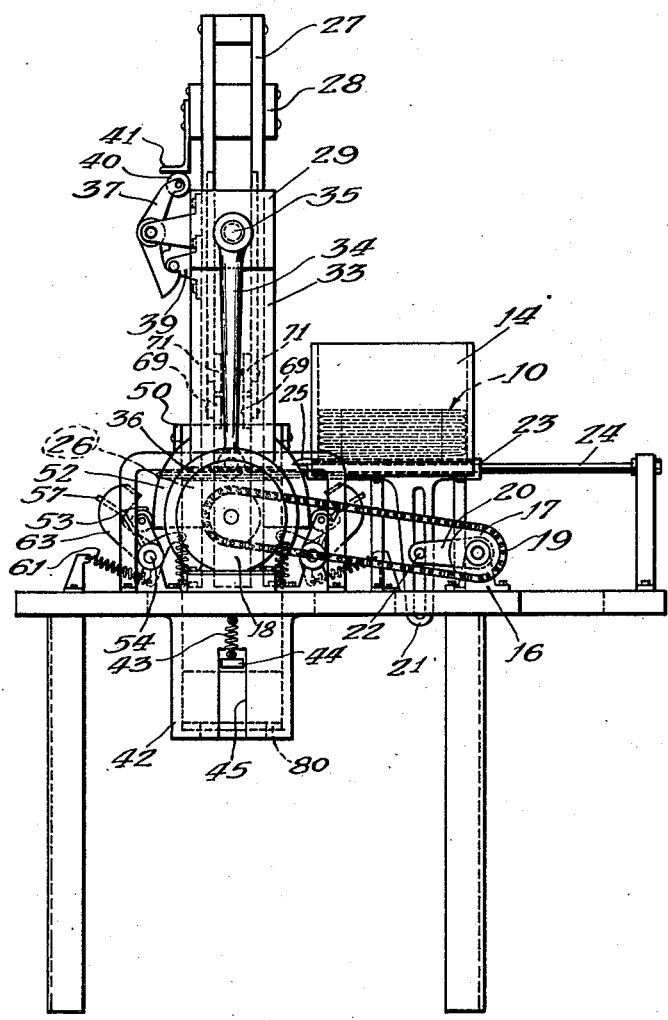
Fig. 2 is a side elevational view taken along the lines 2—2 of Fig. 1.
Figure 3:
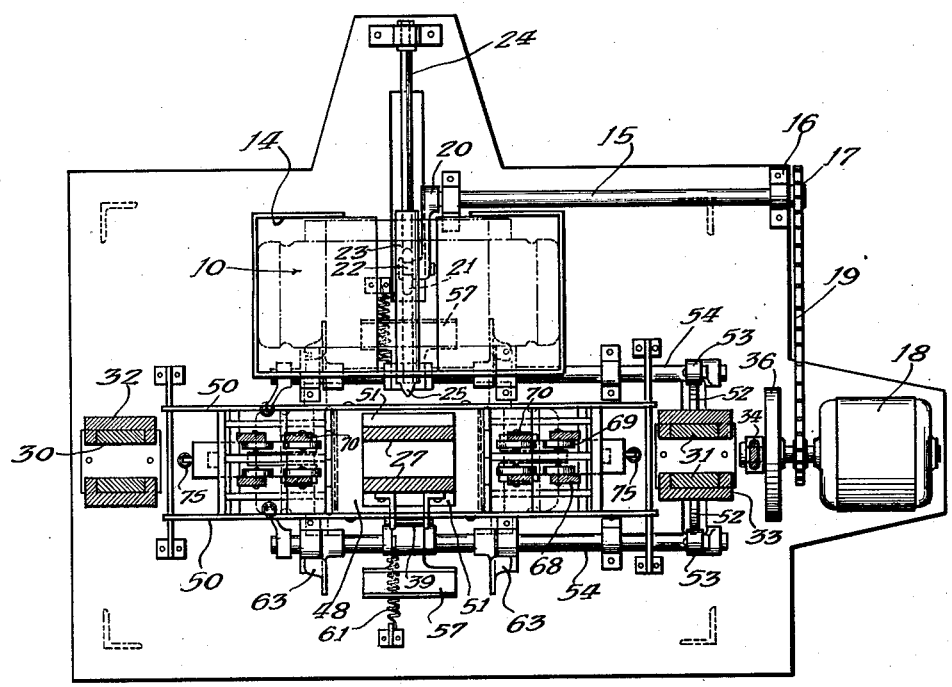
Fig. 3 is a top plan view taken along the lines 3—3 of Fig. 1.

The flattened carton blank will now be positioned directly below a vertically extending plunger member 27, the latter of which is slidably associated with a stationary cross beam 28 and a transversely extending rack 29. The plunger 27 is in raised position (as shown in Fig. 2) when the carton blank is pushed onto table 26, and the raising of the plunger may be accomplished in the following manner. Rack 29 is slidably associated with vertically extending beams 30 and 31 by means of sleeves 32 and 33, respectively. A crank arm 34 is pivotally connected to one end 35 of the rack 29, and the other end of the crank 34 is pivotally associated with a flywheel 36, the latter of which is connected to power source 18. A pivotal clamping member 37 is fixedly attached to the rack 29 and disposed centrally thereof in spaced relation with respect to the plunger 27. When the crank 34 forces rack 29 to its lowermost position, the pivotal member 37, being under the tension of a spring 38, will clamp under a lug 39 extending outwardly from the face of plunger 27, thereby lockingly engaging the plunger 27 to the rack 29.

As the wheel 36 rotates, crank 34 will raise rack 29, together with the locked plunger 27, until a roller 40 on the pivotal catch 37 comes into contact with an outwardly extending bracket 41 connected to the cross beam 28. As the rack 29 is urged further upward, the fixed bracket 41 will cause the roller 40 to pivot the member 37 out of locking engagement with the lug 39, thereby freeing the plunger 27 and permitting it to drop by gravitation until it contacts the top of table 26.

The base of table 26 is slidably engaged in a housing 42 and is normally held in an upraised position within said housing by means of vertically positioned tension springs 43. As shown in Figs. 1 and 2, one end of each spring 43 is connected to the framework of the apparatus and the other end to outwardly extending lugs 44, the latter of which are integral with the base of table 26 and extend outwardly through elongated slots 45 in the sides of housing 42. The upward urging of the table 26 will stop when outwardly extending lugs 44 reach the apex of slots 45 in the sides of housing 42 at which point the top of the table will be in a plane with the bottom of receptacle 14 to permit the member 23 to slide a carton blank on top thereof.

When the carton blank is slid upon table 26 the end flaps 46 (Fig. 14) of the carton will extend beyond the edge of the table and will rest upon pivotally mounted L-shaped supporters 47. When the plunger 27 drops, the head thereof being of slightly smaller dimension than the window section of the carton will protrude through the window and force the bottom 13 of the carton downward and at the same time force the table 26 to the bottom of the housing 42, a distance equivalent to the heighth of the carton. A rubber mat 80 may be provided on the bottom of housing 42 to cushion the impact of the table 26 when it contacts the bottom of the housing. At this stage of the operation the carton will take the form shown in Fig. 15.

The bottom of plunger 27 terminates in a flanged head 49 which seats in a similarly shaped groove 49' (Fig. 4) in a sleeve section 48. This tends to hold the plunger in a true vertical position and at the same time permits the head 49 to be removed from interference with the insertion of a blank carton from receptacle 14. Section 48 surrounds the plunger 27 and is integrally connected to laterally extending framework 50. The purpose of the sleeve 48 is to hold the marginal rim 12 of the carton in a flattened position as the plunger passes through the carton window, thereby preventing stress on the top of the carton and assisting in creasing the sides thereof along their lines of fold. The sleeve 48 also serves another purpose in acting as a stop to the downward motion of the plunger 27 when an outwardly extending lug 51 comes in contact with the top of the sleeve, the lug 51 being set at a predetermined position from the bottom of the plunger to permit the latter to extend into the carton only a distance equal to the heighth thereof.

While the plunger 27 is in the position above described rack 29 will be moved downward by means of the crank arm 34 for the purpose of folding the end flaps into the body of the carton. By reference to Figs. 1 and 2 it will be noted that the bottom of sleeve 33 terminates in an outwardly extending bifurcated cam segment 52 which presses against a roller 53, the latter of which is integrally connected to a shaft 54 by means of a crank arm 55. When the rack 29 is at the apex of its heighth, cam 52 will force the roller 53 in an outward direction, which in turn will rotate the shaft 54 in a reverse direction. As the rack 29 descends the roller 53, being under the tension of coil spring 56 attached to shaft 54, will follow the curvature of cam 52 and will revolve the shaft 54 in an inward direction. As the shaft 54 revolves, an elongated plate 57 will be brought into contact with the side of the carton (Figs. 4 and 8) so that it will be squared, as shown in Fig. 16. The plate 57 is loosely mounted on shaft 54 by means of a collar 58 and set screw 59, the latter being engaged in an elongated slot 60 (Figs. 8 and 9). The purpose of this arrangement is to hold the plate 57 against the side of the carton during the entire set-up operation, as otherwise, if the plate was removed, the sides would tend to bulge out and prevent proper erection of the carton. Plate 57, being loosely mounted on shaft 54, will be forced against the side of the carton by means of tension spring 61 as soon as the set screw 59, fixedly mounted in shaft 54, has revolved a sufficient distance, and will not be removed until the set screw is reversed sufficiently in the slot 60 to contact collar 58.

The next operation is to fold in the side flaps 62 in the manner shown in Fig. 17. This is accomplished by means of tuckers 63, integrally connected to the shaft 54 (Figs. 4 and 5) and slightly offset thereon with respect to plate 57. Immediately after the plate 57 squares up the sides of the carton, the tuckers 63 will be brought into contact with the side flaps 62 by means of the rotating shaft 54 and will fold them inwardly at right angles to the side of the carton. Shaft 54, continuing its forward movement, will then rotate tuckers 63 downwardly out of contact with the carton and interference with the succeeding operation.

Although at times reference has been made to only one side of the carton, it is to be understood that similar apparatus is incorporated on both sides of the table 26 for squaring up the sides and folding the side flaps 62 of the carton.

Figure 10:
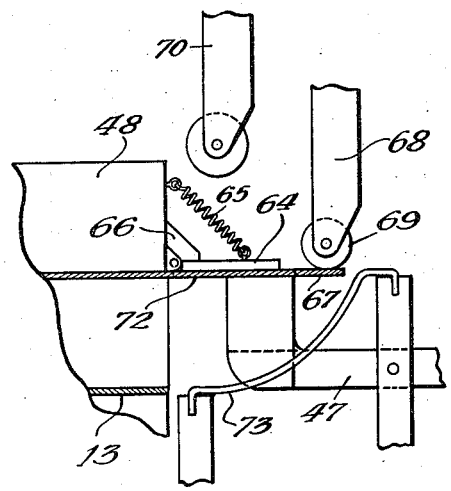
Figs. 10, 11, 12 and 13 are fragmentary detail sectional views showing the progressive manner in which the apparatus folds and tucks the ends of the carton into locking engagement with the bottom thereof.
Figure 11:
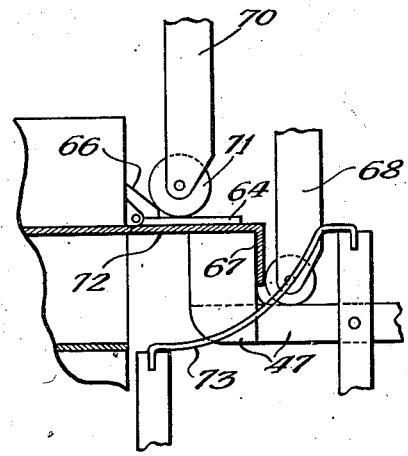

A horizontally extending plate 64 is hingedly connected to each side of sleeve 48 and normally held on a plane with the bottom thereof by means of spring 65 and abutment 66 (Fig. 10). Plate 64 overlies end flap 46, terminating short of the scored section 67 of the end flap, which is held in a horizontal plane by means of pivotal supporters 47. The rack 29 is provided with a pair of vertical downwardly extending bars 68 which are provided with rollers 69 at the bottom thereof. As the rack 29 descends rollers 69 will come in contact with the scored section 67 of the carton and will press it against the upturned portion of support 47, bending it at right angles as shown in Figs. 11 and 18.

Figure 12:
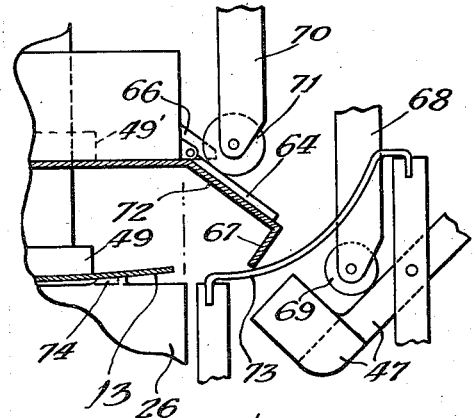
Figure 13:
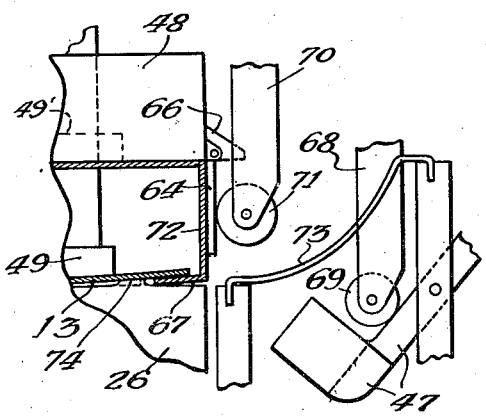

As the bar 68 continues its descent the roller 69 will press against the laterally extending portion of pivotal support 47 displacing it from its normal supporting position. At this point a second pair of downwardly extending bars 70, having rollers 71 at the bottom thereof, will contact plate 64. As the plate 64 is forced downward by the roller 71 it will bend the underlying section 72 of the carton in a right angle manner, as shown in Figs. 11, 12 and 13, and the end section 67 coming in contact with a curvilinear-shaped guideway 73 will be pushed into a plane with the bottom of the carton. The edges of bottom 13 are slightly raised from their normal plane by means of protuberances 74 provided on the surface of table 26 near the marginal edges thereof so that section 67 will be pushed into frictionally locked engagement between the bottom 13 and flaps 76—76. Flaps 76—76 are integral with and extend outwardly from sections 77—77, the latter of which are adhesively united to bottom 13, as shown in Fig. 20.

Upon completion of the operations heretofore described, rack 29 will have reached its lowermost position and the pivotal member 37 will clamp the lug 39 in locked position and will start to ascend accompanied with the plunger 27. As soon as the rollers 71 are raised out of engagement with the plates 64, the latter will rise to their normal position by means of spring 65 and, likewise, supporters 47 will be pivoted back into their normal position by means of coil springs 75, when the pressure of rollers 68 is released therefrom.

When the plunger releases its pressure on table 26 the latter will be raised by means of the springs 43 so that it will again be in a plane with the bottom of receptacle 14 and be in position to receive a flattened carton. As a flattened carton is pushed into the machine it will push the erected carton out of the front thereof.

It is to be understood that the operations of the apparatus heretofore described are performed in an automatic and synchronized manner.

Although my invention has been illustrated and described in connection with setting up the carton covered by my Patent No. 2,306,078, it will be understood that it can be used in connection with erecting other cartons, and that various changes in the form or details of construction and arrangement of parts may be resorted to without departing from the spirit and scope of my invention; hence, I do not wish to limit myself strictly to the structure herein set forth, except as embraced by the following claims.

I claim as my invention:

1. In an apparatus for erecting carton blanks from their flattened state, comprising a movable table to receive a flattened carton blank, a reciprocable plunger for forcing said table and the bottom of the blank down a distance equivalent to the heighth of the carton, means for supporting the end flaps and top of the carton during the downward movement of the reciprocal plunger, means movable relative to the plunger for erecting the side walls of the carton, means for folding the end flaps of the side walls of the carton inwardly, means for bending the end wall flaps of the carton downwardly, and means for bending the end walls of the carton downwardly to move the end wall flaps into frictional locking engagement at the bottom of the carton.

2. In an apparatus for erecting carton blanks from their flattened state, comprising a movable table to receive a flattened carton blank, a reciprocable plunger for forcing said table and the bottom of the blank down a distance equivalent to the heighth of the carton, means for supporting the end flaps and top of the carton during the downward movement of the reciprocal plunger, means pivotally movable relative to the plunger for erecting the side walls of the carton, means pivotally movable for folding the end flaps of the side walls of the carton inwardly, means for bending the end wall flaps of the carton downwardly, and means for bending the end walls of the carton downwardly to move the end wall flaps into frictional locking engagement at the bottom of the carton.

3. In an apparatus for erecting carton blanks from their flattened state, comprising a movable table to receive a flattened carton blank, a reciprocable plunger for forcing said table and the bottom of the blank down a distance equivalent to the heighth of the carton, means for supporting the end flaps and top of the carton during the downward movement of the reciprocal plunger, means movable relative to the plunger for erecting the side walls of the carton, means for folding the end flaps of the side walls of the carton inwardly, reciprocable means for bending the end wall flaps of the carton downwardly, and reciprocable means for bending the end walls of the carton downwardly to move the end wall flaps into frictional locking engagement at the bottom of the carton.

4. In an apparatus for erecting carton blanks from their flattened state, comprising a movable table to receive a flattened carton blank, a reciprocable plunger for forcing said table and the bottom of the blank down a distance equivalent to the heighth of the carton, means for supporting the end flaps and top of the carton during the downward movement of the reciprocal plunger, means pivotally movable relative to the plunger for erecting the side walls of the carton, means pivotally movable for folding the end flaps of the side walls of the carton inwardly, reciprocable means for bending the end wall flaps of the carton downwardly, and reciprocable means for bending the end walls of the carton downwardly to move the end wall flaps into frictional locking engagement at the bottom of the carton.

5. In an apparatus for erecting carton blanks from their flattened state, comprising a movable table to receive a flattened carton blank, a reciprocable plunger for forcing said table and the bottom of the blank down a distance equivalent to the heighth of the carton, means for supporting the end flaps and top of the carton during the downward movement of the reciprocal plunger, a pair of arms pivotally movable relative to the plunger for erecting the side walls of the carton, means for folding the end flaps of the side walls of the carton inwardly, means for bending the end wall flaps of the carton downwardly, and means for bending the end walls of the carton downwardly to move the end wall flaps into frictional locking engagement at the bottom of the carton.

6. In an apparatus for erecting carton blanks from their flattened state, comprising a movable table to receive a flattened carton blank, a reciprocable plunger for forcing said table and the bottom of the blank down a distance equivalent to the heighth of the carton, means for supporting the end flaps and top of the carton during the downward movement of the reciprocal plunger, a pair of arms pivotally movable relative to the plunger for erecting the side walls of the carton, four pivotally movable arms for folding the end flaps of the side walls of the carton inwardly, means for bending the end wall flaps of the carton downwardly, and means for bending the end walls of the carton downwardly to move the end wall flaps into locking engagement at the bottom of the carton.

7. In an apparatus for erecting carton blanks from their flattened state, comprising a movable table to receive a flattened carton blank, a reciprocable plunger for forcing said table and the bottom of the blank down a distance equivalent to the heighth of the carton, means for supporting the end flaps and top of the carton during the downward movement of the reciprocal plunger, a pair of arms pivotally movable relative to the plunger for erecting the side walls of the carton, four pivotally movable arms for folding the end flaps of the side walls of the carton inwardly, reciprocable means for bending the end wall flaps of the carton downwardly, and reciprocable means for bending the end walls of the carton downwardly to move the end wall flaps into locking engagement at the bottom of the carton.

8. In an apparatus for erecting carton blanks from their flattened state, comprising a movable table to receive a flattened carton blank, means for delivering flattened cartons onto said table, a reciprocable plunger for forcing said table and the bottom of the blank down a distance equivalent to the heighth of the carton, means for supporting the end flaps and top of the carton during the downward movement of the reciprocal plunger, a pair of arms pivotally movable relative to the plunger for erecting the side walls of the carton, four pivotally movable arms for folding the end flaps of the side walls of the carton inwardly, reciprocable means for bending the end wall flaps of the carton downwardly, and reciprocable means for bending the end walls of the carton downwardly to move the end wall flaps into locking engagement at the bottom of the carton.

GEORGE C. NYDEGGER.

REFERENCES CITED

The following references are of record in the file of this patent:

UNITED STATES PATENTS

| Number | Name | Date |
|---|---|---|
| 1,406,165 | Beckmann | Feb. 14, 1922 |
| 1,494,977 | Rose | May 20, 1924 |